Nov. 2, 1965     E. R. GILL, JR     3,215,039

REFLEX LIGHT REFLECTING SHEET

Filed March 3, 1961

INVENTOR

Edwin R. Gill, Jr

BY    *Karl W. Flocks*

ATTORNEY 3,215,039
REFLEX LIGHT REFLECTING SHEET
Edwin R. Gill, Jr., Millerton, N.Y., assignor to
Karl W. Flocks, Washington, D.C.
Filed Mar. 3, 1961, Ser. No. 93,069
11 Claims. (Cl. 88—78)

This invention relates to reflex light reflecting sheet material adapted for use in making outdoor signs, markers, guides and the like, and more particularly to a relatively thin pliable weatherproof reflex light reflector sheet.

A reflex light reflector sheet is one which acts on an incident beam or ray of light to refract and reflect in such a manner that most of the light is selectively directed or returned back toward the source in a cone having a small angle, even though the incident light strikes at an angle.

Such reflection is to be distinguished from that produced by a plane reflector, such as a flat metallic surface, where an incident ray is reflected as a ray at an angle equal to the angle of incidence but on the other side of a line drawn normal to the surface at the point of incidence. It is also to be distinguished from the type of reflection produced by a diffusing surface where an incident ray is reflected in all directions with approximately equal intensity distribution over a wide angle. In the first case, an observer must be located substantially on the line of reflection in order to see the reflected light. In the second case, the diffusion of light over a wide angle greatly reduces the intensity of that directed toward the observer. But in the present case, where reflex reflection is obtained, the observer may be at a small angle from the line of incident light, and the light may strike the reflector at an angle, and yet he will be within the cone of reflected light which is of high intensity. Thus, the driver of an automobile whose headlights illuminate the reflex light reflecting sheet, even though at an angle, will be able to see the reflected light at a great distance, and such a sign will be noticed and readable long before an ordinary sign would be visible.

This general optical principle has previously been employed in outdoor signs and markers; however, the present invention embodies this principle in a novel article of manufacture.

Previously proposed reflex-reflective sheet material utilizes glass beads bonded in a binder material. Difficulty has been experienced with such sheet material of the flexible type in preventing the glass beads from falling off of the sheet.

An object of the present invention is to provide continuous reflex reflector sheet material having a smooth outward face and which may be conveniently manufactured from a plastic material having a relatively low index of refraction of the order of 1.50.

A further object of the present invention is to provide a simple, inexpensive means for reflectorizing a sign, card or the like.

A further object of the present invention is to provide reflex reflector sheet material which is weather-proof.

A still further object of the present invention is to provide reflex reflector sheet material which is provided with an integral adhesive coating on the back so that it may be united to the desired base without the need of applying an adhesive.

Another object of the present invention is to provide signs, markers, reflectors and the like made from this reflex reflector sheet material.

Other objects and advantages of this invention will be apparent upon consideration of the following detailed description thereof in conjunction with the annexed drawing wherein.

Figure 1:
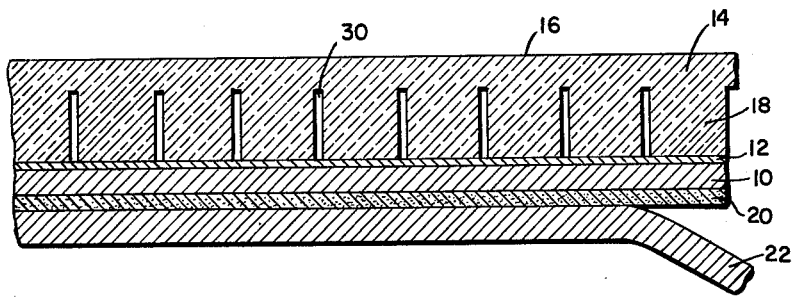
FIG. 1 is a diagram illustrating in magnified form a section of a reflex reflector sheet material in accordance with the invention.
Figure 2:
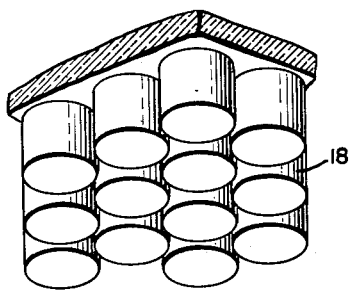
FIG. 2 is a bottom perspective view showing one form of the reflecting elements wherein they are in the form of cylinders.
Figure 3:
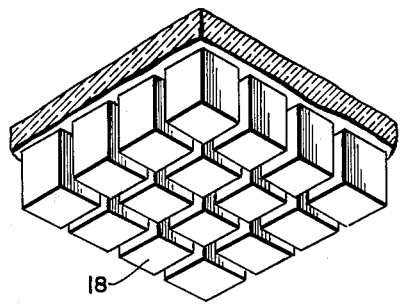
FIG. 3 is a similar view of a second form of reflecting elements which are in the form of cubes.

Referring to the drawings, an illustrative embodiment of a reflex reflector sheet material in accordance with this invention is shown in FIG. 1 formed of a base layer 10 containing an upper reflecting layer or coating 12 adherent thereto which may be, for example, a sheet of aluminum foil. It should be understood that the layer or coating 12 can be of any reflecting material, such as metal or reflecting paint or the like. The face sheet 14 is attached to the reflecting layer 12. The face sheet 14 is a transparent material and has a smooth outward face 16 and a plurality of downwardly extending reflective elements 18 integral therewith. The reflective elements 18 may be in the shape of cylinders as shown in FIG. 2 or cubes as shown in FIG. 3. The flat bottoms of the cylinders or cubes are shown to be permanently cemented to the reflective layer 12. As shown in FIG. 1, the base layer 10 is provided with a layer of sensitive cement 20 and a peelable layer 22 thereon. In use, the layer 22 is peeled off and the sheet is applied directly onto a base, the cement film 20 acting as an adhesive to hold the sheet thereon.

Figure 4:
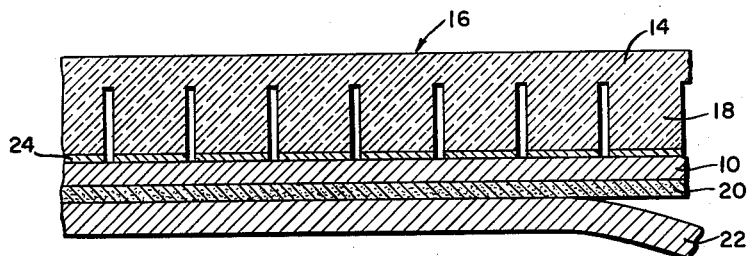
FIG. 4 is a view similar to FIG. 1 showing a modified way of applying the reflecting layer or coating.

The reflecting layer 12 may be continuous, as shown in FIG. 1, or if desired, it may only cover the lower surfaces of the reflecting elements 18, as shown at 24 in FIG. 4. This may be accomplished by metalizing the lower surfaces of the reflecting elements or otherwise coating them with a reflective coating.

Figure 5:
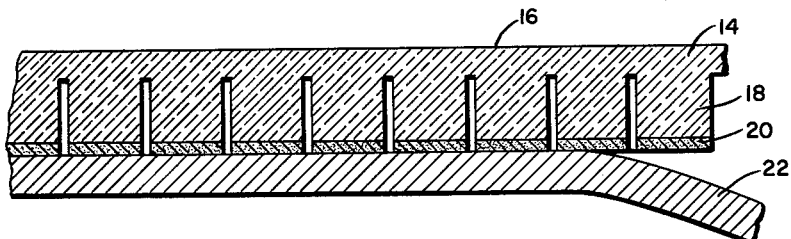
FIG. 5 is a view similar to FIG. 1 showing a form of the invention suitable for use in reflectorizing a sign.

As shown in FIG. 5, the adhesive layer 20 may be applied directly to the bottom surfaces of the reflecting elements 18 and then attached to a peelable layer 22. In use, this sheet may be stripped of the peelable layer and applied directly onto a sign to be reflectorized.

The space 30 between the reflecting elements 18 may be air at ambient conditions, as any condensation of water vapor on the inside vertical surfaces is not objectionable. It is, of course, desirable to seal the edges of the sheet against dirt, insects and other foreign matter.

The reflecting elements may be arranged in aligned rows and columns, as in FIG. 3, or in a staggered arrangement, as in FIG. 2.

The reflecting sheet of this invention is very nearly retro-reflecting with little divergence of the return beams.

The light beam is reflected once by the reflecting layer 12 with total internal reflection at the sides of the reflecting elements 18 and transmission at the face 16. For instance, each cube shown in FIG. 3 may be considered as five tetrahedral mirrors, one face of which is specular. Each reflecting element consists of five planes in rectangular relationship, and this is so whether the downwardly projecting elements 18 are cubes or cylinders; optically the cylinder is a special form of cube.

The present invention is an improvement over applicant's prior Patent 1,902,440.

The present invention does not contemplate coating the surfaces of the reflecting elements other than the lower surface. The reason for this is that while internal reflection at an uncoated surface is almost total, that from a metal coated surface involves a loss due to absorption. If the light is specularly reflected several times, the loss is cumulative. According to the present invention only one specular reflection is involved, and the corrective reflections are at internal grazing incidence at the uncoated sides, therefore the loss is negligible.

The reflex reflecting sheets of the present invention are made of a transparent plastic material having a relatively low index of refraction, as this facilitates the outward refraction from the face of the arrangement.

The size of the reflecting elements has no critical significance from the optical standpoint so that they may be made as small as manufacturing considerations permit. The larger the number of elements per unit area, the better the reflex reflection obtained.

Reflex light reflecting sheet material in accordance with this invention can be produced in a continuous web by suitable processes.

In use the sheet material containing the depending reflecting elements can be cut into the desired shape and readily applied onto a painted reflective surface, as a sign, to render it reflex light reflecting.

The principles disclosed herein may be employed with other than pliable sheets, and this is deemed to be within the scope of the invention. Instead of flexible materials, the upper laminae may be fabricated of glass or stiff plastic material having the desired refractive index and joined by a transparent adhesive.

Sheets in accordance with this invention have the major advantage of having a flat upper surface which is resistant to weather and water. The underside of the reflective elements may be rendered reflecting at the factory as an article of commerce, as shown in the figures.

The reflector sheet material with a reflecting layer underneath can be cut into strips and cemented to highways as center striping, and may be used as a marking for abutments and the like.

It will be obvious to those skilled in the art that various changes may be made without departing from the spirit of the invention and therefore the invention is not limited to what is shown in the drawings and described in the specification but only as indicated in the appended claims.

What is claimed is:

1. A weatherproof reflex light reflector sheet adapted to be supplied in roll form for use in making signs and indicia for outdoor use, comprising a water resistant light transmitting upper lamina, said upper lamina having a flat upper surface and a plurality of separated depending reflecting elements on its inwardly facing surface, said elements being arranged in an all-over pattern covering the inwardly facing surface of the lamina, each said reflecting element having uncoated vertical side walls and a flat bottom wall, and a reflecting surface secured to the flat bottom walls of said elements, said sheet being adapted to be attached to a base member.

2. A sheet in accordance with claim 1, wherein each said reflecting element is in the shape of a cube.

3. A sheet in accordance with claim 1, wherein each said reflecting element is in the shape of a cylinder.

4. A sheet in accordance with claim 1, wherein the outer lamina and the reflecting elements are made of a material having a relatively low index of refraction of the order of 1.50.

5. A sheet in accordance with claim 1 wherein said reflecting surface is a continuous film.

6. A sheet in accordance with claim 1 wherein said reflecting surface covers only the flat bottom walls of said reflecting elements.

7. In a sign or marker adapted for outdoor exposure and having a relatively rigid base with at least a portion of the surface thereof being light reflecting, a water resistant light reflex reflector sheet adhesively united to the base and comprised of a water resistant light transmitting outer lamina, said outer lamina having a flat outer surface and a plurality of separated depending reflecting elements extending inwardly from the inward facing surface, said elements being arranged in an all-over pattern covering the inwardly facing surface of the lamina, each said reflecting element having uncoated vertical side walls and a flat bottom wall, a light transmitting adhesive cementing the outer lamina to said base, the combination of said sheet and said light reflecting portions of said base producing a reflexive reflection of incident light.

8. A sign in accordance with claim 7, wherein each said reflecting element is in the shape of a cube.

9. A sign in accordance with claim 7, wherein each said reflecting element is in the shape of a cylinder.

10. A sign in accordance with claim 7, wherein the outer lamina and the reflecting elements are made of a material having a relatively low index of refraction of the order of 1.50.

11. A sign or marker adapted for outdoor exposure comprising a base onto which has been cemented a weatherproof light reflex reflector sheet, said sheet comprising a water resistant light transmitting outer lamina, said outer lamina having a flat outer surface and a plurality of separated depending reflecting elements extending inwardly from the inward facing surface, said elements being arranged in an all-over pattern covering the inwardly facing surface of the lamina, each said reflecting element having uncoated vertical side walls and a flat bottom wall, and a reflective lamina attached to the bottom walls of said reflecting elements.

References Cited by the Examiner

UNITED STATES PATENTS

| | | | |
|---|---|---|---|
| 1,821,227 | 9/31 | Mackey et al. | |
| 1,902,440 | 3/33 | Gill. | |
| 2,043,414 | 6/36 | Korff | 88—82 X |
| 2,143,946 | 1/39 | Hunter. | |
| 2,205,534 | 6/40 | Lytle. | |
| 2,354,049 | 7/44 | Palmquist | 88—82 X |
| 2,354,857 | 8/44 | Gits et al. | |
| 2,411,222 | 11/46 | Meigs. | |
| 2,422,256 | 6/47 | Phillippi. | |
| 2,489,499 | 11/49 | Pellar | 88—79 |
| 2,646,364 | 7/53 | Porth. | |
| 2,653,516 | 9/53 | Johnson | 88—57 |
| 2,666,373 | 1/54 | Mattson | 88—59 X |
| 2,713,286 | 7/55 | Taylor | 88—82 |
| 3,029,702 | 4/62 | Rupert | 88—78 |

FOREIGN PATENTS

| | | |
|---|---|---|
| 398,647 | 9/33 | Great Britain. |
| 441,319 | 1/36 | Great Britain. |

JEWELL H. PEDERSEN, *Primary Examiner.*

WILLIAM MISIEK, *Examiner.*